US008642192B2

(12) United States Patent
Lee et al.

(10) Patent No.: US 8,642,192 B2
(45) Date of Patent: Feb. 4, 2014

(54) SECONDARY BATTERY

(75) Inventors: Sang-Joo Lee, Yongin-si (KR);
Heui-Sang Yoon, Yongin-si (KR);
Woon-Seong Baek, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 286 days.

(21) Appl. No.: 13/039,247

(22) Filed: Mar. 2, 2011

(65) Prior Publication Data
US 2012/0028081 A1 Feb. 2, 2012

(30) Foreign Application Priority Data
Jul. 29, 2010 (KR) .................. 10-2010-0073444

(51) Int. Cl.
*H01M 2/02* (2006.01)
(52) U.S. Cl.
USPC .................. 429/7; 429/65; 429/177
(58) Field of Classification Search
USPC .................. 429/7, 65, 177; 361/809
See application file for complete search history.

(56) References Cited

U.S. PATENT DOCUMENTS

| 2005/0181242 A1 | 8/2005 | Suzuki et al. | |
| 2009/0092891 A1* | 4/2009 | Kwag et al. | 429/99 |
| 2009/0130494 A1* | 5/2009 | Jang | 429/7 |
| 2009/0263711 A1* | 10/2009 | Kim et al. | 429/164 |
| 2010/0203363 A1* | 8/2010 | Kwak et al. | 429/7 |
| 2011/0097607 A1* | 4/2011 | Park et al. | 429/7 |

FOREIGN PATENT DOCUMENTS

| JP | 2005-166644 A | 6/2005 |
| JP | 2006-147193 A | 6/2006 |
| KR | 10-2005-0087632 A | 8/2005 |
| KR | 10-2006-0110405 | 10/2006 |
| KR | 10-2009-0078181 | 7/2009 |

OTHER PUBLICATIONS

KIPO Office Action dated Sep. 15, 2011 for KR Application No. 10-2010-0073444 (4 pages).
KIPO Notice of Allowance dated Dec. 27, 2011, for Korean priority Patent application 10-20100073444, noting references previously submitted in an IDS dated Oct. 14, 2011, 1 page.
Korean Patent Abstracts, Publication No. 10-2006-0110405, corresponding to Korean Patent No. 10-883921, 1 page.
Korean Patent Abstracts, Publication No. 10-2009-0078181, corresponding to Korean Patent No. 10-0947973, 1 page.

* cited by examiner

*Primary Examiner* — Stephen J. Kalafut
(74) *Attorney, Agent, or Firm* — Christie, Parker & Hale, LLP

(57) ABSTRACT

A secondary battery includes a bare cell comprising an electrode assembly; a protection circuit module electrically coupled to the bare cell; an upper case including a first case and a second case opposite to the first case joined together, the upper case generally encompassing the protection circuit module; and at least one support rib on at least one of the first case and the second case supporting the protection circuit module.

16 Claims, 8 Drawing Sheets

SECONDARY BATTERY

CROSS-REFERENCE TO RELATED APPLICATION

This application claims priority to and the benefit of Korean Patent Application No. 10-2010-0073444, filed on Jul. 29, 2010, in the Korean Intellectual Property Office, the entire content of which is incorporated herein by reference.

BACKGROUND

1. Field

An aspect of the present invention relates to a secondary battery.

2. Description of the Related Art

Recently, the use of electronic devices such as cellular phones and notebook computers has increased, and batteries are built in the electronic devices so that it is easy to transport and use the electronic devices. In view of economical efficiency, rechargeable secondary batteries are widely used as the power source for electronic devices. Representative secondary batteries are exemplified by a nickel-cadmium battery, a nickel-hydrogen battery, a lithium ion secondary battery, and the like. Particularly, a lithium secondary battery is widely used because its operating voltage is about three times higher than a nickel-cadmium battery or nickel-hydrogen battery, and its energy density per weight is high.

Since the deterioration or heat generation of a lithium ion secondary battery may be caused by overcharge or overdischarge, the maximum/minimum voltage or temperature of the lithium ion secondary battery is necessarily controlled. Accordingly, a protection circuit module including a secondary protection element is provided to the lithium ion secondary battery. For example, generally used secondary protection elements are a field effect transistor (FET), a positive temperature coefficient (PCT) element, a control integrated circuit (IC), and the like. Since these secondary protection elements are weak against external impact or heat, they may be easily damaged. Therefore, caution is required in manufacturing and handling of these secondary protection elements. Since electronic devices have become light weight and compact, it is difficult to sufficiently protect secondary batteries from external impact using only outer casings of these electronic devices. Therefore, it is desired to develop a secondary battery including a case for a protection circuit module, in which the damage of the protection circuit module can be prevented by the secondary battery itself, and whose manufacturing cost can be reduced.

SUMMARY

Embodiments provide a secondary battery which can prevent a protection circuit module from being damaged and ensure the stability and productivity of the secondary battery by providing a case of the protection circuit module having a lower manufacturing cost.

Embodiments provide a secondary battery in which an upper case is divided into first and second cases that are joined together without using a molding process of the upper case, so that it is possible to provide a safe and firm secondary battery.

According to an aspect of the present invention, a secondary battery is provided including a bare cell comprising an electrode assembly; a protection circuit module electrically coupled to the bare cell; an upper case including a first case and a second case opposite to the first case joined together, the upper case generally encompassing the protection circuit module; and at least one support rib on at least one of the first case and the second case supporting the protection circuit module.

In embodiments, the first case and the second case are separated along a longitudinal axis of the upper case and at least one support rib protrudes from an edge of one of the first and second cases. Additionally, the support rib may be located closer to the bare cell than a terminal portion of the protection circuit module.

In one embodiment, at least one of the first case and the second case has an opening through which the protection circuit module is exposed and the opening may extend along a longitudinal axis of the upper case of the first case and the second case. Additionally, a fixing member on the secondary battery may include a first portion having a hole and a second portion without a hole, and wherein the first portion and the second portion are stepped with respect to each other such that the first portion is spaced from the protection circuit module.

In one embodiment, the first case and the second case include at least one fastening portion, and the fastening portion may include a first extending portion having a groove on the first case and a first projection on the second case generally corresponding to the groove. Additionally, the fastening portion may further include a second projection on the first case and a second extending portion on the second case and having a groove generally corresponding to the second projection. Further, at least one hook may extend from the first case and the second case.

Additionally, an upper rib located distal to the protection circuit module with respect to the bare cell supports the protection circuit module. In one embodiment, the upper rib is oriented to have a substantially planar surface extend in a direction substantially perpendicular to a longitudinal axis of the protection circuit module. Further, the upper rib may be integral as a single piece with the first case.

As described above, according to embodiments of the present invention, an upper case that covers a protection circuit board is divided into a first case and a second case. Since the upper case is joined by a fastening portion, adhesive or the like, a secondary battery can be manufactured without a molding process that requires a high-temperature and high-pressure condition. Thus, it is possible to significantly reduce the likelihood of a failure of a secondary protection element or the deterioration of the secondary battery, caused by the molding process. Since a process of inspecting the failure of the secondary protection element, and the like are omitted after the molding process, manufacturing time can be decreased, and the manufacturing cost can be reduced.

Also, the upper case that protects the protection circuit module is formed as a single body, but cases that constitute the upper case are assembled to the protection circuit module. Thus, the position of a terminal portion can be more precisely controlled, and a contact failure or the like is significantly less likely in the use of the upper case because the protection circuit module does not significantly move within the upper case.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
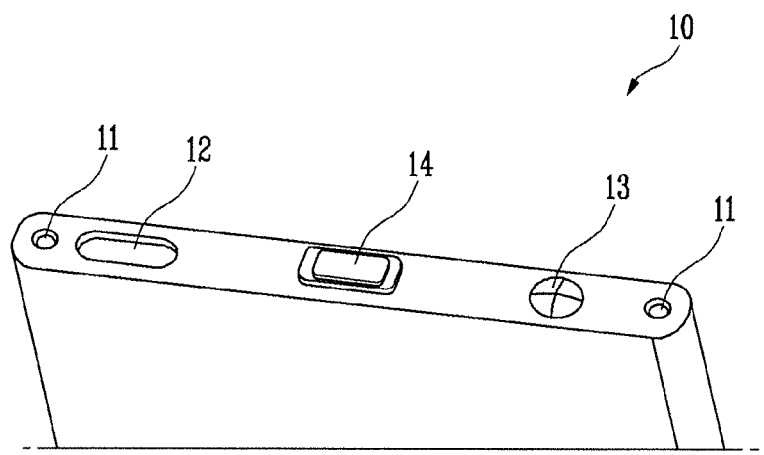
FIG. 1 a perspective view showing an upper portion of a bare cell.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

Exemplary embodiments of the present invention will be described in detail with reference to the accompanying drawings.

In the embodiments of the present invention, a secondary battery includes a bare cell having an electrode assembly; a protection circuit module electrically connected to the bare cell; an upper case divided into a first case joined at one side of the protection circuit module and a second case joined at the other side of the protection circuit module to be opposite to the first case; and one or more support ribs formed in at least one of the first and second cases to support the protection circuit module.

FIG. 1 is a perspective view showing an upper portion of a bare cell.

Referring to FIG. 1, fixing portions 11, a vent 12, an injection hole 13 and an electrode 14 are formed at a top portion of the bare cell 10.

The bare cell 10 is manufactured by inserting an electrode assembly into the interior thereof and injecting an electrolyte through the injection hole 13. Here, the electrode assembly includes a positive electrode, a negative electrode and a separator. The electrode assembly may be electrically connected to the exterior of the bare cell 10 through a tab.

The fixing portions 11 having the shape of a groove are provided at both sides of the top portion of the bare cell 10. The fixing portions 11 are used to settle the position of a protection circuit module and to fasten and fix the protection circuit module. The fixing portion 11 may be formed in the shape of a cone, cylinder, rectangular parallelepiped or the like to generally correspond to the shape of a member fastened thereto.

The vent 12 may be formed at one side of the top portion of the bare cell 10. In a case where the pressure of the interior of the bare cell 10 is increased, the vent 12 is opened to prevent the bare cell 10 from becoming a fire hazard.

The positions and shapes of the vent 12, the injection hole 13 and the electrode 14, shown in FIG. 1, may be varied according to the design of the secondary battery.

Figure 2A:
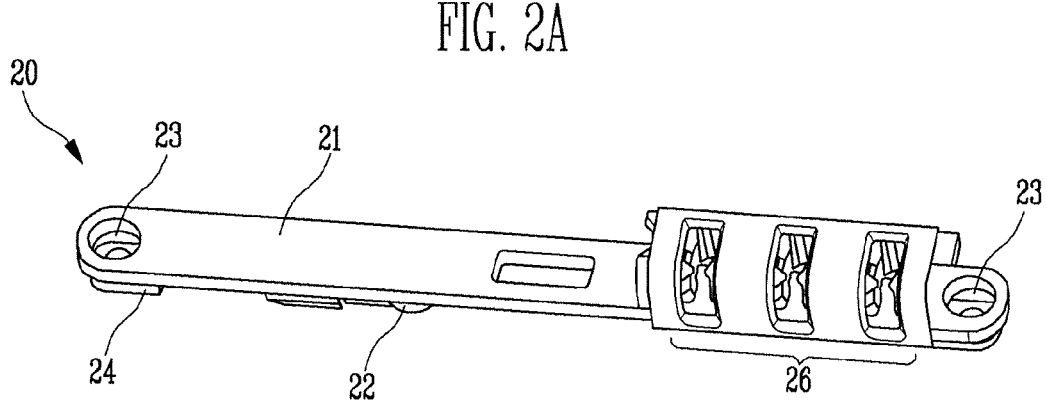
FIG. 2A is a perspective view showing a top of a protection circuit module according to an embodiment of the present invention.
Figure 2B:
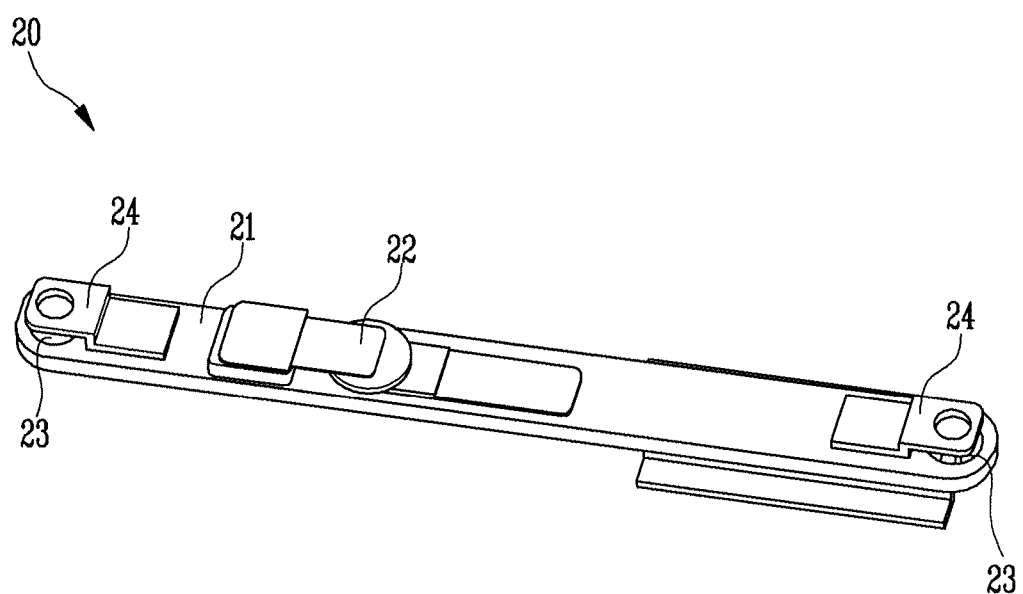
FIG. 2B is a perspective view showing a bottom of the protection circuit module according to the embodiment of the present invention.

FIG. 2A is a perspective view schematically showing a top of a protection circuit module according to an embodiment of the present invention. FIG. 2B is a perspective view schematically showing a bottom of the protection circuit module according to the embodiment of the present invention.

Referring to FIGS. 2A and 2B, the protection circuit module 20 includes a protection circuit board 21, a secondary protection element 22, fixing holes 23, fixing members 24 and a terminal portion 26 that electrically connects the secondary battery to the exterior of the secondary battery.

The protection circuit board 21 is provided with a circuit, the secondary protection element 22 and the like, which constitute the secondary battery. The secondary protection element 22 is positioned on a bottom surface of the protection circuit board 21 to be close to the bare cell 10 (see FIG. 5). The secondary protection element 22 is used to prevent the secondary battery from being deteriorated or from exploding by controlling current and voltage that flow into the secondary battery. The secondary protection element 22 may be a positive temperature coefficient (PTC) element.

The fixing holes 23 are located at both side portions of the protection circuit board 21. A fixing member 24 may be provided at a position corresponding to each fixing hole 23. The fixing member 24 has a stepped structure wherein one of the steps has a hole. In the fixing member 24, the step without a hole is attached to a bottom surface of the protection circuit board 21, and the step with a hole is positioned below the fixing hole 23 and spaced from the fixing hole 23. Therefore, a gap is between the step with the hole and the protection circuit board 21 to form a path for fastening together with the fixing hole 23. The fixing hole 23 and the fixing member 24 are connected together with the fixing portion 11 of the bare cell 10 by a separate joining member 25, so that the protection circuit module 20 is fixed to the bare cell 10 (see FIG. 4A). In one embodiment, each of the holes may be configured based on the size and shape of the joining member, the design of the secondary battery, or the like. The joining member may be, for example, a screw.

Figure 3A:
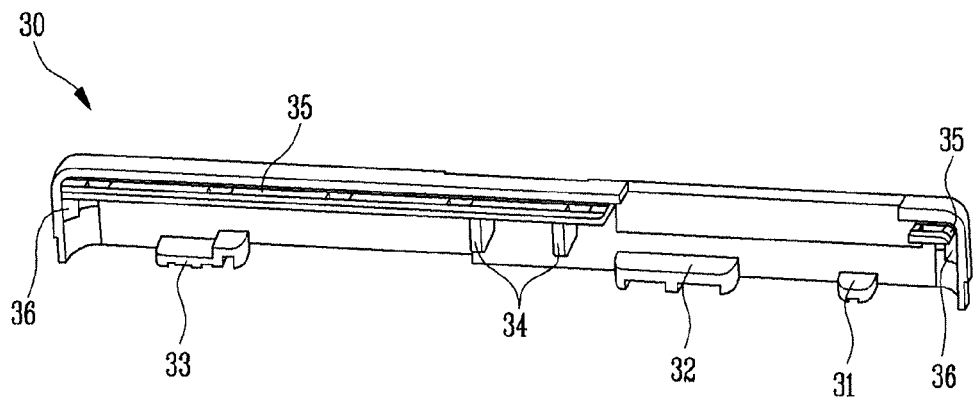
FIG. 3A is a perspective view showing the interior of a first case according to the embodiment of the present invention.
Figure 3B:
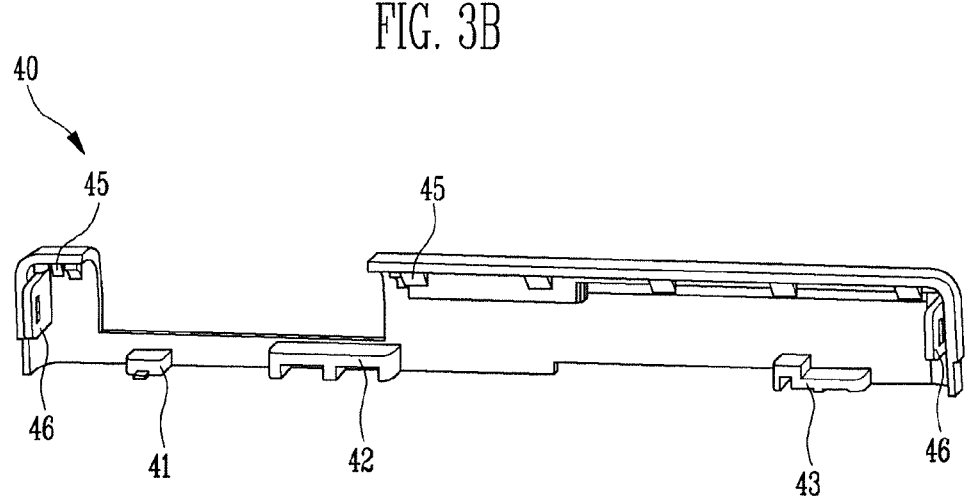
FIG. 3B is a perspective view showing the interior of a second case according to the embodiment of the present invention.

FIG. 3A is a perspective view showing the interior of a first case according to the embodiment of the present invention. FIG. 3B is a perspective view showing the interior of a second case according to the embodiment of the present invention.

As can be seen in FIGS. 3A and 3B, an upper case of the secondary battery according to the embodiment of the present invention is divided into a first case 30 positioned at a first side (e.g., the right side) and a second case 40 positioned at a second side (e.g., the left side) with respect to the longitudinal section of a long-side portion thereof.

Referring to FIGS. 3A and 3B, the first and second cases 30 and 40 have an opening through which the terminal portion 26 of the protection circuit module 20 can be exposed at one upper side thereof. The opening may be formed on any one side of the first and second cases 30 and 40. In one embodiment, openings may be formed at both sides of the first and second cases 30 and 40. The opening may be formed throughout a long-side surface which will be described later at one side of the top surface of each of the first and second cases. However, in general the opening may be configured based on the shape and size of the terminal portion of the protection circuit module.

The first and second cases 30 and 40 are formed so that long-side surfaces and short-side surfaces are extended downward from the top surface, i.e., toward the bare cell 10.

Meanwhile, the bottom surface of the first and second cases 30 and 40 may be opened except a portion at which a fixing portion or rib which will be described later is formed.

After the protection circuit module is fastened and fixed to the bare cell, the first and second cases 30 and 40 are joined at the right and left sides while generally encompassing the protection circuit module. Fastening portions for joining the first and second cases 30 and 40 with each other are formed at the top, bottom and side surfaces of the first and second cases 30 and 40. The fastening portions are formed at the top, bottom and side surfaces of the first and second cases 30 and 40 so that the upper case can be more firmly joined together. However, it will be apparent that the position and number of the fastening portions may be variously modified according to the size and shape of the upper case or the kind of adhesive, if any, used as an additional joining member.

In this embodiment, one or more support ribs 32 and 42 for supporting the protection circuit module 20 may be formed to be extended from lower portions of the first and second cases 30 and 40, respectively. The support rib may be formed on any one side of the first and second cases 30 and 40. However, in one embodiment, as shown the supports ribs are formed on both the first and second cases 30 and 40.

Further, an upper rib 34 may be formed at any one or both inner surfaces of the long-side portion of the first or second case 30 or 40 so that the protection circuit module is supported at an inner upper portion of the upper case and so that the upper case is more firmly joined. In this embodiment, the upper rib 34 is formed at the inner surface of the long-side portion of the first case 30.

Hereinafter, the first and second cases 30 and 40 that constitute an upper case, the fastening portions formed at the cases 30 and 40, the support ribs and the upper rib will be individually described in detail.

In this embodiment, as described above, the upper case that covers the protection circuit module 20 is divided into first and second cases 30 and 40 respectively positioned at, for example, the right and left sides with respect to the longitudinal section of a long-side portion thereof.

The first and second cases 30 and 40 may be joined with each other by fastening portions respectively formed at the top, bottom and side surfaces thereof. The first and second cases 30 and 40 may be more firmly joined using an additional adhesive or the like, if desired.

The fastening portions of each of the first and second cases are divided into a first fastening portion formed at the top surface, a second fastening portion at the bottom surface and a third fastening portion formed at the side surface.

The first fastening portion includes a first extending portion 35 having at least one groove formed therein and at least one first projection 45. The first extending portion 35 having the grooves formed therein is attached along an upper inner surface of the first case 30, and the one or more projections 45 are formed at positions corresponding to the one or more grooves of the first extending portion 35 on an upper inner surface of the second case 40. The first extending portion 35 may be stepped with the top surface of the first case 30 so that the one or more grooves are exposed. The first extending portion 35 and the first case 30 may be integrally formed as one piece with each other and made from the same material. FIG. 4C is an enlarged view showing the first extending portion 35 and the first projection 45 being fastened to each other.

As shown in FIG. 3A, an upper rib 34 may be additionally formed at an inner surface of the long-side portion of the first case 30 so as to support the protection circuit module at an inner upper portion of the upper case and to allow the upper case to be more rigid. The upper rib 34 is integrally formed with the first extending portion 35 at which the grooves of the first fastening portion are formed to fix the protection circuit module positioned adjacent thereto. Thus the upper rib 34 can firmly support the protection circuit module so that the protection circuit module does not significantly move within the upper case.

In this embodiment, the second fastening portion includes first hooks 31 and 41 and second hooks 33 and 43 respectively formed to be extended inward from bottom end portions of the first and second cases 30 and 40. The first hooks 31 and 41 and the second hooks 33 and 43 may be provided at sides of the first and second cases 30 and 40, respectively. Referring to these figures, the first hooks 31 and 41 are formed below the position (i.e., closer to the bare cell 10) at which the terminal portion 26 of the protection module 20 is formed, and the second hooks 33 and 43 are formed between portions at which the secondary protection element 22 and the hole of the fixing member 24 are formed, respectively. Here, the portions are positioned at the opposite side of the terminal portion 26 of the protection circuit module 20. The first hooks 31 and 41 and the second hooks 33 and 43 are formed at positions generally corresponding to each other so as to fasten and join the first and second cases 30 and 40 to each other and to settle and fix the positions of the protection circuit board 21 and the fixing members 24.

With respect to the first hooks 31 and 41 and the second hooks 33 and 43 as the second fastening portion, only one may be formed as a fastening portion, and the other may be formed as an upper rib that supports the protection circuit board 21 or to reinforce the first and second cases 30 and 40. In this case, the second hooks 33 and 34 may be formed at the opposite side of the terminal portion 26 of the protection circuit module 20, and the first hooks 31 and 41 may be formed at the other side in the shape of an upper rib. In a case where the first hooks 31 and 41 are formed in the shape of an upper rib, they contact the fixing member 24 attached to the bottom surface of the protection circuit board 21 to fix the position of the protection circuit module 20 and the fixing member 24. The first hooks 31 and 41 that serve as an upper rib may be provided on only one side or both sides of the first and second cases. When the first hooks 31 and 41 that serve as an upper rib are provided to both sides of the first and second cases, they may be positioned to cross or intersect each other or may be positioned to correspond to each other.

In this embodiment, the third fastening portion may be formed at both sides of each of the first and second cases 30 and 40. As shown in FIGS. 3A and 3B, the third fastening portion includes second projections 36 formed at side inner surfaces of the first case 30 and second extending portions 46 formed at corresponding positions of the second case 40. A groove is formed at the second extending portion 46, and the second extending portion 46 is formed stepped with the side of the second case 30. The second extending portion 46 may be integrally formed with the second case 40 or may be formed as a separate member.

In this embodiment, the support ribs for supporting the protection circuit module and fixing the position of the protection circuit module are formed to be extended inwardly from the bottom end portions of the first and second cases 30 and 40, respectively. That is, the support ribs 32 and 42 support the protection circuit board 21 and the terminal portion 26 at a lower position of the terminal portion 26.

The upper rib 34 supports the protection circuit board 21 while contacting the top surface (i.e., the surface facing away from the bare cell 10) of the protection circuit board 21, and the support ribs 32 and 42 support the protection circuit board 21 while contacting the bottom surface (i.e., the surface toward the bare cell 10) of the protection circuit board 21. Thus, the protection circuit module 20 having the protection circuit board 21 can be more firmly fixed in the upper case to substantially prevent movement thereof. The upper rib 34 may be substantially perpendicular to a longitudinal axis of the protection circuit module 20 in the first case 30. By using the upper rib 34, the strength of the upper case can be increased. Thus, the thickness of the upper case can be manufactured to be thinner. Accordingly, manufacturing cost can be saved, and the weight of the secondary battery can be minimized.

In this embodiment, the support ribs 32 and 42 and the upper rib 34 may be provided to any one of the first and second cases or may be provided to both the first and second cases. In the secondary battery according to this embodiment, in a case where the first and second cases are joined with the protection circuit module, the position of the protection circuit module can be fixed by the support ribs 32 and 42 and the upper rib 34. In this embodiment, the first hooks 31 and 41 may also serve as a rib that supports the protection circuit module. Thus, the position of the protection circuit module is more firmly fixed, and the protection circuit module does not significantly move within the upper case.

Figure 4A:
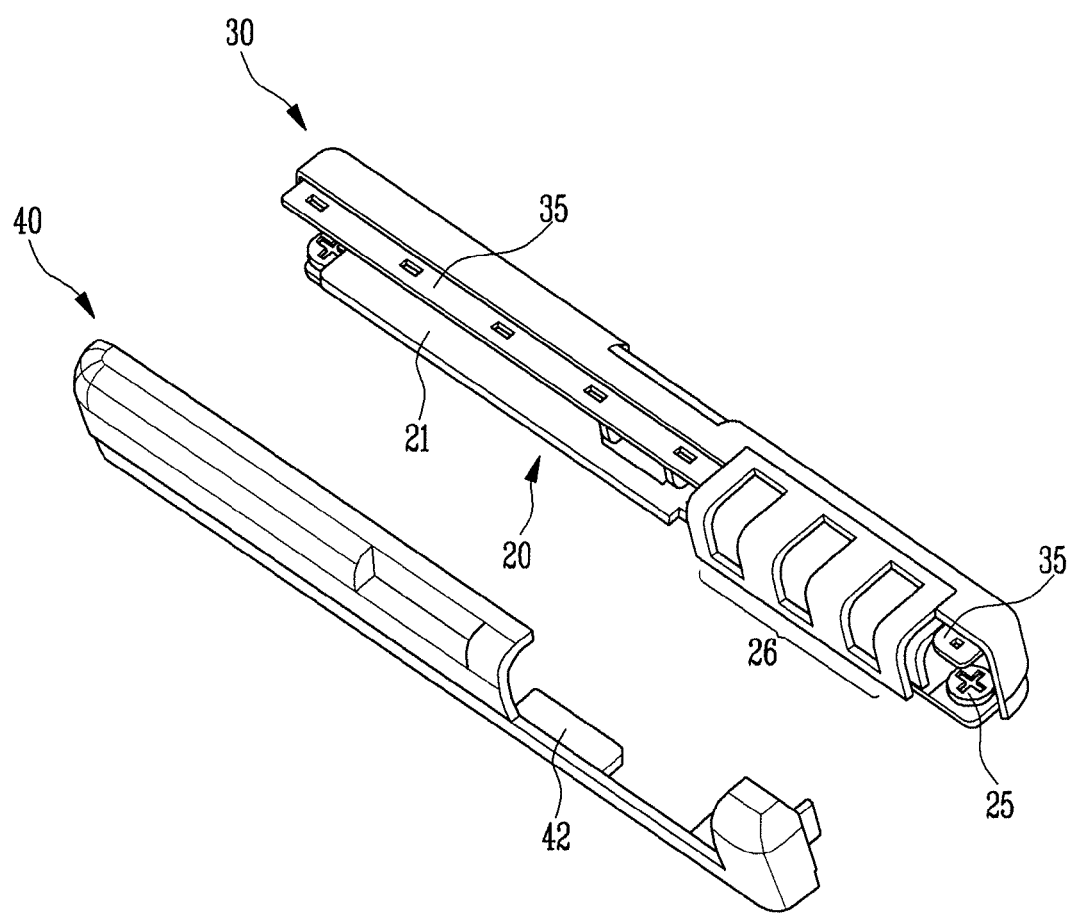
FIG. 4A is a perspective view showing the assembled structure between the protection circuit module and the first case and an upper side of the second case according to the embodiment of the present invention.
Figure 4B:
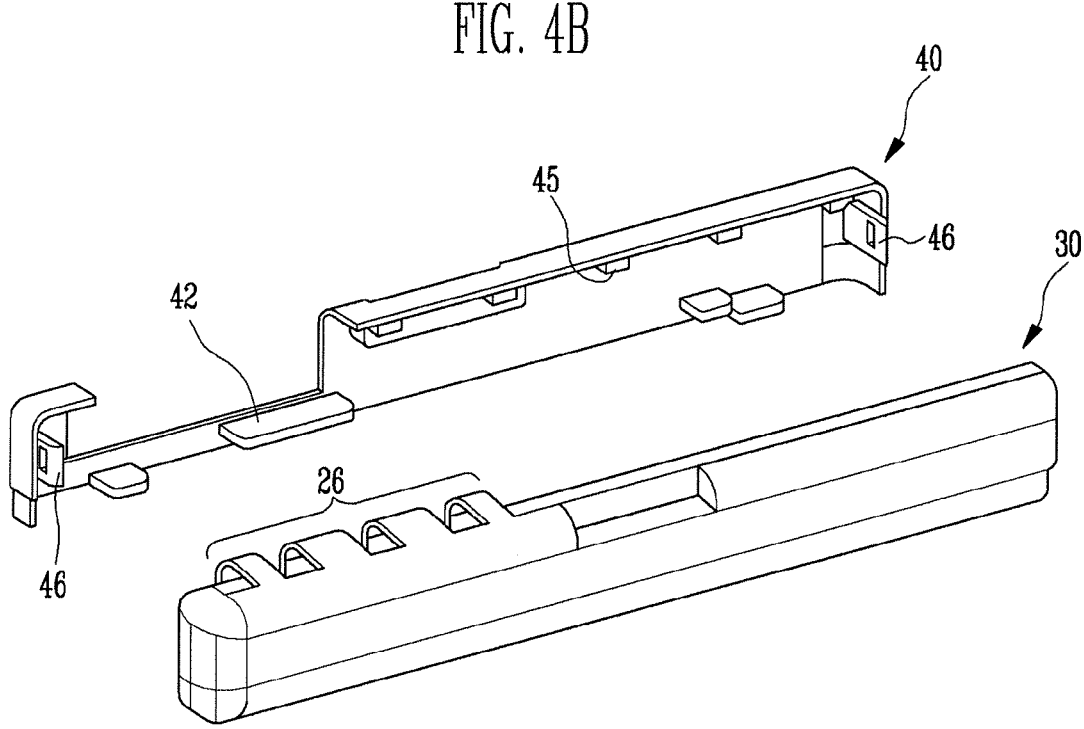
FIG. 4B is a perspective view showing the assembled structure between the protection circuit module and the first case and a side of the second case according to the embodiment of the present invention.
Figure 4C:
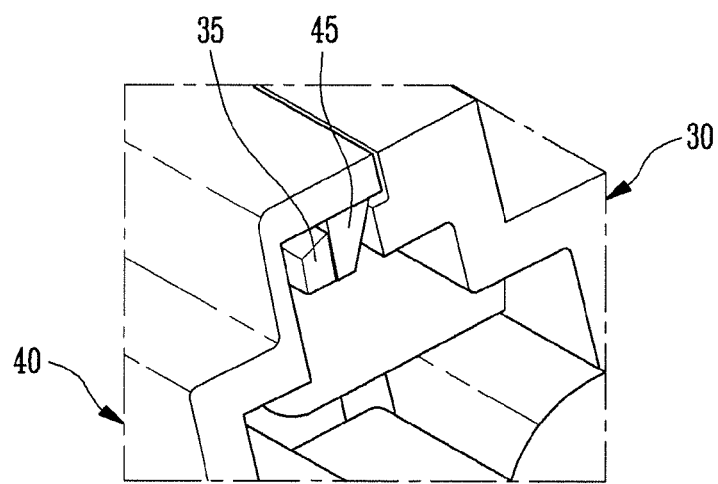
FIG. 4C is an enlarged view showing the state that first fastening portions are fastened to each other.

FIG. 4A is a perspective view schematically showing the assembled structure between the protection circuit module and the first case and an upper side of the second case according to the embodiment of the present invention. FIG. 4B is a perspective view schematically showing the assembled structure between the protection circuit module and the first case and a side of the second case according to the embodiment of the present invention.

The state that the protection circuit module is joined with the first and second cases by the fastening portions provided to the first and second cases will be described with reference to FIGS. 4A and 4B.

First, a first extending portion 35 having one or more grooves is formed stepped with the top surface of the first case at the upper inner surface of the first case, and the one or more first projections 45 are formed at the positions of the upper inner surface of the second case, corresponding to the grooves formed at the first extending portion 35, respectively. The first projection 45 is inserted into the corresponding groove of the first extending portion 35 so that the first and second cases are joined together.

The second extending portion 46 and the second projections 36 (see FIG. 3A) formed at the inner surfaces of the respective cases are joined with each other in the same manner of the first extending portion 35 and the first projections 45. In this instance, an adhesive material such as an adhesive may be used at the portion at which the groove and projection are joined together, so that the first and second cases can be more firmly joined together.

In an alternate embodiment where the fastening portions are omitted, the first and second cases may be joined together using an adhesive material such as an adhesive or double-faced adhesive tape. The first and second extending portions and the first and second projections are used to join the first and second cases together. These fastening portions are positioned to correspond to each other, and the shapes and positions of the fastening portions are not limited thereto.

Figure 5:
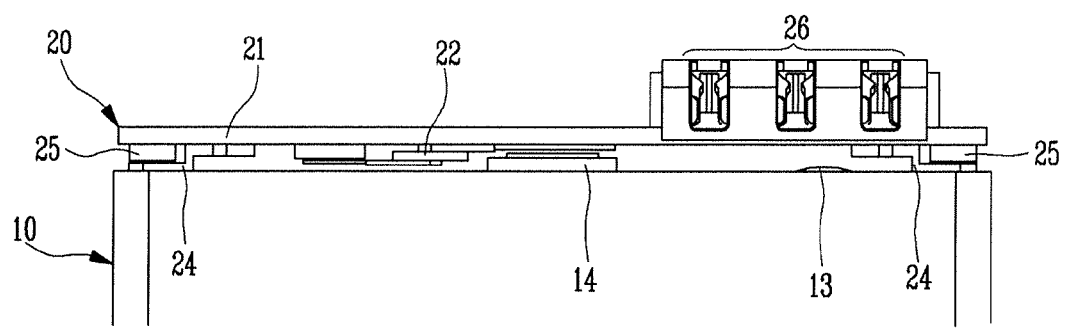
FIG. 5 is a side view showing a state that the protection circuit module is joined to a bare cell according to the embodiment of the present invention.
Figure 6:
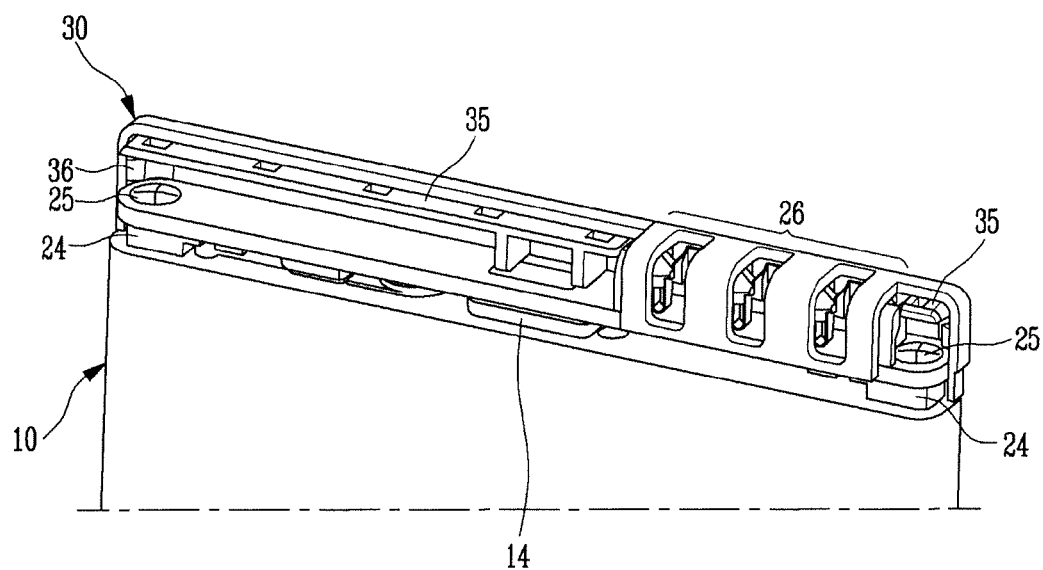
FIG. 6 is a perspective view showing a state that the protection circuit module and the first case are joined to the bare cell according to the embodiment of the present invention.

FIG. 5 is a side view showing a state that the protection circuit module is joined to a bare cell according to the embodiment of the present invention. FIG. 6 is a perspective view schematically showing a state that the protection circuit module and the first case are joined to the bare cell according to the embodiment of the present invention.

Referring to FIGS. 5 and 6, the protection circuit module 20 is fixed to the fixing portions 11 (see FIG. 1) of the bare cell 10 through the fixing holes 23 and the fixing members 24. In this instance, the protection circuit module 20 may be fixed to the bare cell 10 using the joining member 25 such as a screw. The secondary protection element 22 is positioned between the electrode 14 and the vent 12 (see FIG. 1) of the bare cell 10, and the injection hole 13 is positioned below the terminal portion 26. After the protection circuit module 20 is fixed to the bare cell 10 as described above, the first and second cases 30 and 40 are fastened and joined to each other by respectively inserting them from sides of the protection circuit module 20.

Figure 7:
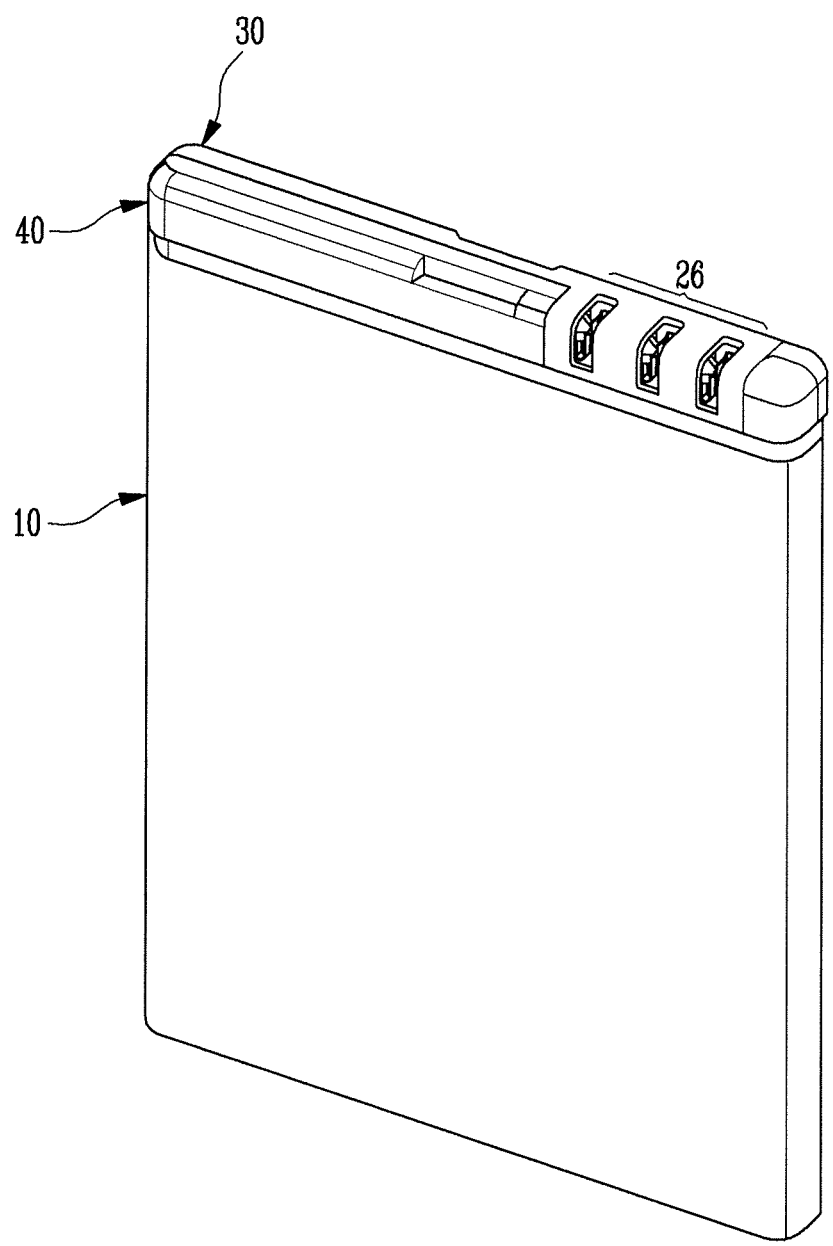
FIG. 7 is a perspective view of a secondary battery according to the embodiment of the present invention.

FIG. 7 is a perspective view of a secondary battery according to the embodiment of the present invention, which shows the state that the bare cell 10, the protection circuit module 20 and the first and second cases 30 and 40 are finally assembled together. The first and second cases 30 and 40 are fastened and joined to each other from both the sides of the protection circuit module 20 with respect to the longitudinal section of the long-side portion thereof, and the terminal portion 26 of the protection circuit module 20 is exposed through the opening of the cases 30 and 40.

Figure 8:
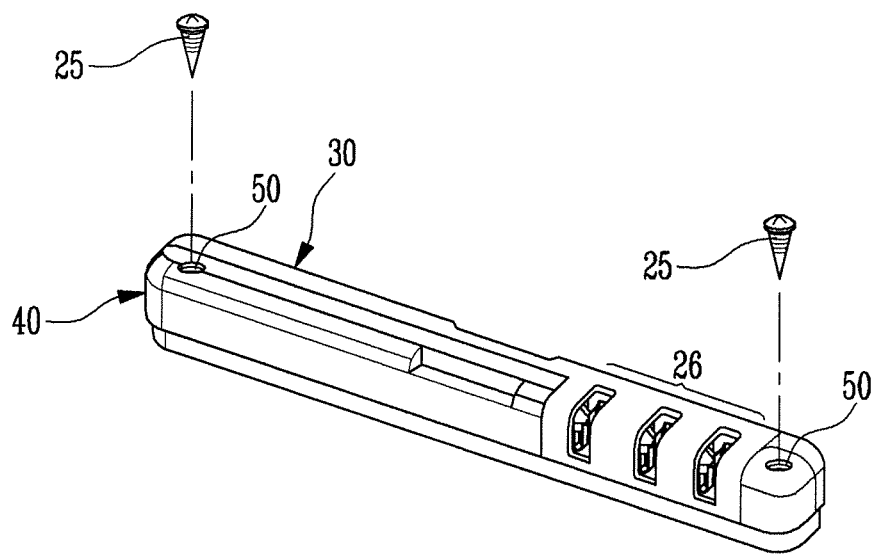
FIG. 8 is a perspective view showing a state that cases having fastening holes are joined together according to an embodiment of the present invention.

FIG. 8 is a perspective view of an upper case according to an embodiment of the present invention.

In this embodiment, the first and second cases 30 and 40 are first joined with the protection circuit module and then assembled to the bare cell. In this embodiment, separate fastening holes 50 are provided to both outer surfaces of the first and second cases 30 and 40, respectively. The fastening holes 50 are formed at positions corresponding to the positions at which the fixing portions 11 (see FIG. 1) are formed, respectively. The fastening holes 50 may be used to allow the first and second cases 30 and 40 and the protection circuit module to be joined with the fixing portions 11 (see FIG. 1) by separate joining members 25. Thus, this embodiment is different from the aforementioned embodiments in that the fastening holes 50 for the joining members 25 are further provided in addition to the opening through which the terminal portion 26 of the protection circuit module is exposed on the top surfaces of the first and second cases 30 and 40.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising:
a bare cell comprising an electrode assembly;
a protection circuit module electrically coupled to the bare cell;
an upper case comprising a first case and a second case opposite to the first case joined together, the upper case generally encompassing the protection circuit module and including at least one fastening portion comprising a first extending portion extending along a longitudinal axis of the first case and having a groove, and a first projection on the second case generally corresponding to the groove; and
at least one support rib on at least one of the first case and the second case supporting the protection circuit module, the at least one support rib comprising an upper rib integral with the first extending portion.

2. The secondary battery according to claim 1, wherein the first case and the second case are separated along a longitudinal axis of the upper case.

3. The secondary battery according to claim 1, wherein the at least one support rib protrudes from an edge of one of the first and second cases.

4. The secondary battery according to claim 3, wherein the at least one support rib is located closer to the bare cell than a terminal portion of the protection circuit module.

5. The secondary battery according to claim 1, wherein at least one of the first case and the second case has an opening through which the protection circuit module is exposed.

6. The secondary battery according to claim 5, wherein the opening extends along a longitudinal axis of the upper case of the first case and the second case.

7. The secondary battery according to claim 1, wherein the protection circuit module has fixing holes, and wherein fixing members are connected to the protection circuit module at positions generally corresponding to the fixing holes.

8. The secondary battery according to claim 7, wherein the fixing member comprises a first portion having a hole and a second portion without a hole, and wherein the first portion and the second portion are stepped with respect to each other such that the first portion is spaced from the protection circuit module.

9. The secondary battery according to claim 8, wherein joining members extend through the fixing holes of the protection circuit module and through the hole of the fixing member and are fastened to fixing portions on the bare cell.

10. The secondary battery according to claim 1, wherein the fastening portion further comprises a second projection on the first case and a second extending portion on the second case and having a groove generally corresponding to the second projection.

11. The secondary battery according to claim 1, wherein at least one hook extends from the first case and the second case.

12. The secondary battery according to claim 11, comprising a plurality of hooks, wherein one of the plurality of hooks is formed on either side of the support rib.

13. The secondary battery according to claim 1, wherein the upper rib is oriented to have a substantially planar surface extend in a direction substantially perpendicular to a longitudinal axis of the protection circuit module.

14. The secondary battery according to claim 1, wherein the upper rib is integral as a single piece with the first case.

15. The secondary battery according to claim 1, wherein at least one of the first case and the second cases further comprises fastening holes.

16. The secondary battery according to claim 15, wherein joining members extend through the fastening holes and fixing holes on the protection circuit module and are fastened to fixing portions on the bare cell.

* * * * *

UNITED STATES PATENT AND TRADEMARK OFFICE
CERTIFICATE OF CORRECTION

| | |
|---|---|
| PATENT NO. | : 8,642,192 B2 |
| APPLICATION NO. | : 13/039247 |
| DATED | : February 4, 2014 |
| INVENTOR(S) | : Sang-Joo Lee et al. |

It is certified that error appears in the above-identified patent and that said Letters Patent is hereby corrected as shown below:

In the Claims

Column 10, line 30, Claim 15   Delete "cases"

Insert -- case --

Signed and Sealed this
Eleventh Day of August, 2015

Michelle K. Lee
*Director of the United States Patent and Trademark Office*